(12) United States Patent
Riani et al.

(10) Patent No.: US 8,532,203 B1
(45) Date of Patent: Sep. 10, 2013

(54) COMMUNICATION SYSTEMS AND METHODS USING BLIND CHANNEL ESTIMATION BASED ON CUMULANTS

(75) Inventors: Jamal Riani, Santa Clara, CA (US); Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 797 days.

(21) Appl. No.: 12/472,588

(22) Filed: May 27, 2009

Related U.S. Application Data

(60) Provisional application No. 61/058,039, filed on Jun. 2, 2008.

(51) Int. Cl.
*H04K 1/10* (2006.01)
*H04L 27/28* (2006.01)

(52) U.S. Cl.
USPC .......................................................... 375/260

(58) Field of Classification Search
USPC ................. 375/341, 291, 344, 299, 150, 232, 375/354, 316, 233, 346
See application file for complete search history.

(56) References Cited

U.S. PATENT DOCUMENTS

| | | | | |
|---|---|---|---|---|
| 4,827,472 | A * | 5/1989 | Ferrieu | 370/291 |
| 5,526,378 | A * | 6/1996 | Knutson et al. | 375/229 |
| 7,266,132 | B1 * | 9/2007 | Liu et al. | 370/538 |

OTHER PUBLICATIONS

Nikias et al., ARMA Modeling of Fourth Order Cumulants and Phase Estimation, 1988, Circuits and Systems Signal Process, vol. 7, No. 3.*

Nikias et al., ARMA Modeling of Fourth Order Cumulant and Phase Estimation, 1988, Circuits and Systems Signal Process, vol. 7, No. 3.*

Ding, Z. et al, "A Cumulant Matrix Subspace Algorithm for Blind Single FIR Channel Identification," IEEE Transactions on Signal Processing, 49:2, Feb. 2001, pp. 325-333.

Hung, K. et al, "Joint Carrier Recovery and Multimodulus Blind Decision-Feedback Equalization Under High-Order QAM," IEEE Communications Society, Globecom 2004, pp. 2281-2285.

* cited by examiner

*Primary Examiner* — Chieh M Fan
*Assistant Examiner* — Wednel Cadeau

(57) ABSTRACT

Embodiments of the present invention include communication systems and methods using channel estimation based on cumulants. In one embodiment, the present invention includes a receiver comprising a sampler coupled to a communication channel for receiving an input signal and providing samples of the input signal at a first sample rate, a channel estimation circuit coupled to receive the sampled input signal, the channel estimation circuit estimating the amplitude response of the communication channel by autocorrelating the input signal, estimating the phase response of the communication channel using a fourth order cumulant of the input signal, and generating an estimated impulse response of the communication channel using the estimated amplitude response and the estimated phase response, and a channel initialization circuit coupled to the channel estimation circuit for configuring the receiver using the estimated impulse response.

20 Claims, 4 Drawing Sheets

COMMUNICATION SYSTEMS AND METHODS USING BLIND CHANNEL ESTIMATION BASED ON CUMULANTS

CROSS REFERENCE TO RELATED APPLICATIONS

This application claims priority based on provisional patent application 61/058,039, filed Jun. 2, 2008, the entire disclosure of which is incorporated herein by reference.

BACKGROUND

The present invention relates to communication systems, and in particular, to techniques for performing blind channel estimation.

FIG. 1 illustrates a communication system including a transmitting system 101 ("transmitter") and a receiving system 103 ("receiver"). The transmitter transmits a signal including information across a communication channel 102 to the receiver. Each of the transmitting system 101 and the receiving system 103 may include both a transmitter and receiver for sending and receiving signals across the communication channel 102.

Communication channels are often characterized by impulse response, or equivalently, frequency response. For example, if a signal is transmitted across the communication channel, the signal may be modified as a result of having propagated through the communication channel. Since it is typically desirable to receive the same signal at the output of the communication channel as was transmitted at the input of the communication channel, such changes or modifications to the signal are referred to as distortion. Distortion may include attenuation of certain frequency components or phase shifting of such frequency components, for example. Causes of distortion may include inter symbol interference, reflections, or non-idealities of the communication channel. The impulse response (or frequency response) may be used to model the distortion of a communication channel. The receiver may reduce the distortion of the received signal in order to obtain a more accurate representation of the transmitted signal. For discrete time signal processing, the impulse response and frequency response may be represented as discrete time or frequency functions. In FIG. 1, the communication channel 102 is represented by a discrete time impulse response h(n).

In some communication systems, information having predefined characteristics may be sent across the communication channel to measure the effects of the communication channel on the transmitted signal. The impulse response of the communication channel may then be determined by examining the actual effects of the channel on the transmitted and received signal, where the transmitted signal is known (e.g., the transmitted signal contains known characteristics, for example, in a preamble). One problem with this technique is that the communication systems must execute a calibration or training sequence by sending and receiving the predefined information. In many communication systems, it is desirable to receive the transmitted signal and estimate the impulse response from the properties of the received signal. If an accurate estimate of the impulse response can be obtained, the receiver may be configured to correct for some of the distortion of the channel. Existing techniques for estimating the impulse/frequency response of a communication channel are computationally intensive, lack desired accuracy, and/or suffer from other problems.

SUMMARY

Embodiments of the present invention include communication systems and methods using channel estimation based on cumulants. In one embodiment, the present invention includes a receiver comprising a sampler and a channel estimation circuit. The sample is configured to sample an input signal, the input signal having been received by the receiver through a communication channel. The channel estimation circuit receives the sampled input signal, estimates an amplitude response of the communication channel by autocorrelating the input signal, estimates a phase response of the communication channel using a fourth order cumulant of the input signal, and generates an estimated impulse response of the communication channel based on the estimated amplitude response and the estimated phase response. The receiver further includes a channel initialization circuit to configure the receiver based on the estimated impulse response.

In one embodiment, the phase response is iteratively estimated at a particular frequency.

In one embodiment, the phase response is estimated according to a phase equation $\psi_n = \phi_{n+1} + \phi_n$, where $\psi_n$ is a phase of the fourth order cumulant of the input signal, and $\phi_n$ and $\phi_{n+1}$ represent the phase response at different frequencies.

In one embodiment, the phase response is determined from the phase equation using least squares fit comprising a matrix inversion.

In one embodiment, the phase response is determined from the phase equation recursively.

In one embodiment, the phase response is estimated by estimating the fourth order cumulant of the input signal.

In one embodiment, said estimate of the fourth order cumulant of the input signal comprises estimating the Fourier Transform of the input signal and estimating the Fourier Transform of the fourth order cumulant based on the estimated Fourier Transform of the input signal.

In one embodiment, estimating the Fourier Transform of the input signal and the fourth order cumulant are performed iteratively at the sample rate of the sampler.

In one embodiment, estimating the Fourier Transform of the input signal and the fourth order cumulant are determined across a plurality of discrete time frequencies to produce an average over many received symbols.

In one embodiment, the communication channel is a digital cable.

In one embodiment, the communication channel is an Ethernet cable.

In another embodiment, the present invention includes a method of receiving a signal across a communication channel, the method comprising receiving, at a receiver, an input signal transmitted across the communication channel, estimating an amplitude response of the communication channel by autocorrelating the input signal, estimating a phase response of the communication channel using a fourth order cumulant of the input signal, generating an estimated impulse response of the communication channel based on the estimated amplitude response and the estimated phase response, and configuring the receiver based on the estimated impulse response.

Additional embodiments will be evident from the following detailed description and accompanying drawings, which provide a better understanding of the nature and advantages of the present invention.

DETAILED DESCRIPTION

Described herein are techniques for retrieving information including similarity search retrieval methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
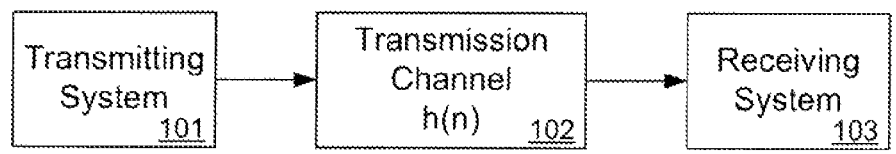
FIG. 1 illustrates a communication system.
Figure 2:
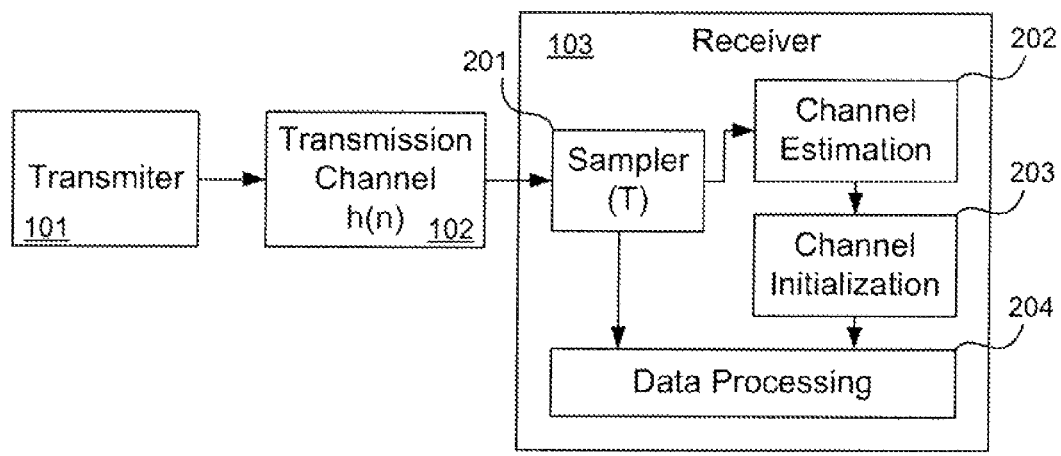
FIG. 2 illustrates a communication system according to one embodiment of the present invention.

FIG. 2 illustrates a communication system including a transmitter 101 and a receiver 103. Features and advantages of the present invention include generating an estimate of the impulse response (or equivalently, the frequency response). Here, the discrete time frequency response, h(n), of channel 102 may be estimated. An output of transmitter 101 provides a signal to the input of channel 102. An output of channel 102 is coupled to an input of receiver 103 for receiving the transmitted signal through the channel. Receiver 103 may include a sampler 201 for receiving and sampling the signal (e.g., using an analog-to-digital converter). Sampler 201 is coupled to the communication channel 102 for receiving an input signal and providing samples of the input signal at a sample rate. For example, the sampler 201 may sample the input signal to the receiver at a frequency of 1/T, where 1/T is the Baud Rate. The baud rate is 1/T, where T is the channel symbol duration also called unit interval.

In one embodiment, a channel estimation circuit 202 is coupled to the sampler 201 to receive the sampled input signal. Channel estimation circuit 202 may use the sampled input signal to estimate the impulse response, h(n), of channel 102. For instance, channel estimator 202 may estimate the amplitude response and the phase response of the communication channel 102 using an autocorrelation of the input signal. Features and advantages of the present invention include using a cumulant of the input signal (e.g., a fourth order cumulant of an autocorrelated input signal) to estimate the phase response of the channel. Channel estimator 202 may generate an estimate of the impulse response, h(n) of the communication channel using the estimated amplitude response and the estimated phase response. An output of channel estimator 202 is coupled to the input of a channel initialization circuit 203. Channel initialization circuit 203 may receive the estimate of the impulse response (or frequency response) and configure the receiver using the estimated frequency response. Here, sampler 201 is coupled to a data processing channel 204 for carrying out operations on the received input signals. Channel initializer 203 is also coupled to the data processing channel 204 and may configure the data processing channel to perform operations on the received data to reduce distortions caused by transmission channel 102.

Figure 3A:
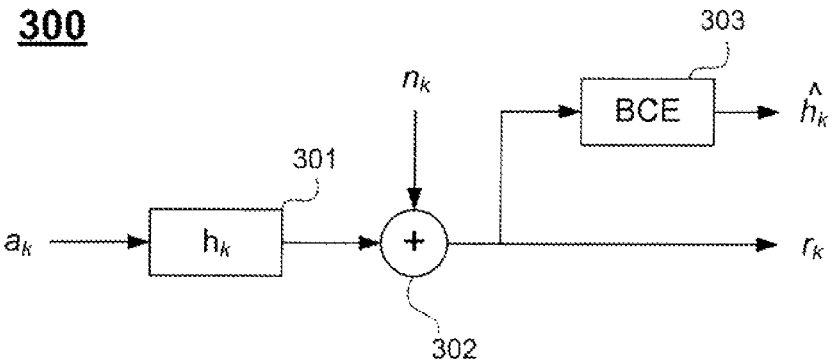
FIG. 3A illustrates a model of a communication system according to one embodiment of the present invention.

FIG. 3A illustrates a model 300 of a communication system according to one embodiment of the present invention. Model 300 may be used to represent the system and process of estimating the impulse response, h(n). For example, transmitted data, $a_k$, is received at the input of communication channel 301 having an impulse response $h_k$. Noise in the communication channel is modeled by adding Gaussian white noise, $n_k$, at 302. The resulting signal, $r_k$, is received by the receiver and sampled at the Baud Rate (1/T). The received signal is coupled to the input of a channel estimation block 303. Since the channel estimation in this case is done without using known information, the estimation is referred to Blind Channel Estimation ("BCE"). The output of BCE 303 is an estimate of the channel impulse response, $\hat{h}_k$, which may be used to configure the receiver to process the received signal, $r_k$.

Figure 3B:
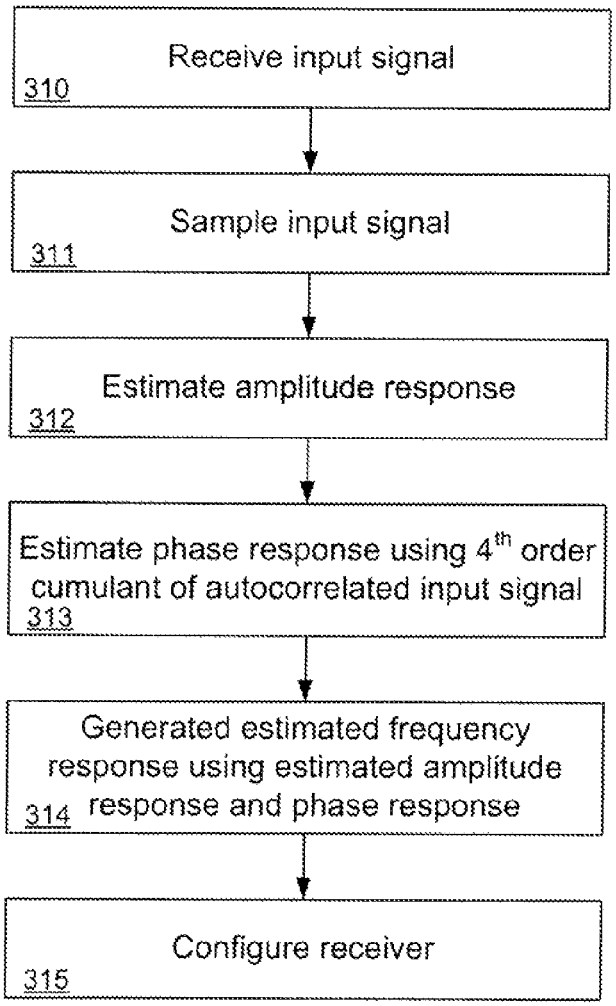
FIG. 3B illustrates a process for use in a communication system according to one embodiment of the present invention.

FIG. 3B illustrates a process for use in a communication system according to one embodiment of the present invention. At 301, the input signal is received across a communication channel. At 311, the input signal is sampled (e.g., at the Baud Rate, 1/T). The impulse response may be determined by first determining the amplitude response and phase response. For example, at 312, the amplitude response is estimated. At 313, the phase response is estimated. In one embodiment, the phase response is estimated using the fourth ("$4^{th}$") order cumulant of the autocorrelated input signal as described in more detail below. At 314, the impulse response may be estimated from the estimated amplitude response and the estimated phase response. Using the estimated impulse response, the receiver may be configured to process the received signal at 315.

Referring again to FIG. 3A, model 300 represents a linear FIR channel with additive white and Gaussian noise. The transmitted data $a_k$ is independent and identically distributed ("i.i.d.") and is not known to the receiver. The objective of the blind channel estimation (BCE) 303 is to estimate the channel impulse response $h_k$ based only on the received sequence $r_k$ of the input signal. The data $a_k$ may be taken from a complex constellation. The channel length L (i.e. $h_k=0$ for k<0 or k>L−1) may be estimated from the autocorrelation of the input signal, $r_k$, and therefore it may become known.

The channel amplitude response can be estimated from the autocorrelation of the input signals to the receiver, $r_k$.

$$\rho_n = E[r_k r^*_{k-n}]$$

where * denotes complex conjugate and where $E[|a_k|^2]=1$.

The Fourier Transform of the autocorrelation results in the following:

$$\Gamma(\Omega) = \sum_n \rho_n e^{-j2\pi n\Omega} = |H(\Omega)|^2 + \sigma^2$$

where H denotes the Fourier transform of $h_k$ which is as follows:

$$H(\Omega) = \sum_k h_k e^{-j2\pi k\Omega}$$

and $\sigma^2$ is the channel noise variance. An efficient computation of Γ according to one embodiment of the present invention is described in more detail below.

Phase response may also be estimated from the input signal. For example, the fourth ($4^{th}$) order cumulant is defined as follows:

$$c_{n,m} = \frac{E[|r_k|^2 r_{k-n}^* r_{k-m}] - \rho_0 \rho_{n-m} - 2\rho_n \rho_m}{\gamma};$$

$$\gamma = E[|a_k|^4] - 2E[|a_k|^2]^2$$

Noting the following equation:

$$\forall n,m \; c_{n,m} = \Sigma_k |h_k|^2 h^*_{k-n} h_{k-m}$$

The two-dimensional Fourier Transform of the $4^{th}$ order cumulant, c, may be used as follows:

$$C(\Omega_1, \Omega_2) = \Sigma_{n,m} c_{n,m} e^{-j2\pi \Omega_2}$$

$$C(\Omega_1, \Omega_2) = F(\Omega_1 + \Omega_2) H^*(\Omega_1) H(-\Omega_2)$$

where F denotes the Fourier Transform of $|h_k|^2$. The Fourier Transform of the $4^{th}$ order cumulant may be used to estimate the phase response. An efficient process for determining the Fourier Transform of the cumulant according to an embodiment of the present invention is described below.

The following description illustrates an example technique for estimating the channel phase response recursively. The blind channel estimation problem may be solved by considering the Fourier Transform of the $4^{th}$ order cumulant for frequencies $\Omega_1 + \Omega_2 = -1/N$ for a large value N. For $\Omega_1 = n/N$ and $\Omega_1 = -(n+1)/N$, this yields:

$$C_n = C\left(\frac{n}{N}, -\frac{n+1}{N}\right) = F\left(-\frac{1}{N}\right) H*\left(\frac{n}{N}\right) H\left(\frac{n+1}{N}\right)$$

Since $$F(0) = \sigma_k |h_k|^2 \neq 0$$

then, for large N, we have $F(-1/N) \neq 0$, which yields a recursive way to find the phase of H(n/N) because $H(n/N) \neq 0$. The resulting solution has an unknown linear phase term, due to the phase of $F(-1/N)$, and an unknown constant phase term (i.e., $e^{j0}$) due to the phase of $H(n_0)$, where $n_0$ is the frequency index recursion is started from.

Assuming that the channel has no spectral zeros, the phase of $C_n$ may be used to determine an estimation of phase $\phi_n$ of H(n/N) based on the following equation:

$$\psi_n = \phi_{n+1} - \phi_n$$

where the phase $\phi_n$ of H(n/N) is:

$$\frac{H\left(\frac{n}{N}\right)}{\left|H\left(\frac{n}{N}\right)\right|} = e^{j\varphi_n}$$

and where $\psi_n$ is the phase of C(n/N, −(n+1)/N). Additionally, the unknown phase of F(−1/N) may be omitted, which yields estimation linear phase uncertainty that may, in turn, be estimated as described below. By setting $\phi_0 = 0$, which is not necessarily the correct value, a constant phase term results. From this value, $\phi_1$ may be determined as $\psi_0 + \phi_0$. Next, $\phi_2$ may be determined from $\phi_1$ in the same manner, and additional phase values may be determine in the same manner. Additionally, the same procedure may be applied to get $\phi_{-1}$, $\phi_{-2}$, etc. In one application described in more detail below, the constant phase term mentioned above may be compensated by a phase locked loop (PLL). This recursive procedure will work even if the channel has a zero at Nyquist as this is the last frequency to be processed in the recursive scheme. More generally, the above recursive scheme will work in the presence of one channel zero by applying the recursion in such a way that the zero frequency is left as last frequency in the recursion.

Once we obtain $\phi_n$, H(n/N) is estimated as $$\sqrt{\Gamma\left(\frac{n}{N}\right)} e^{j\varphi_n}$$

and the inverse Fourier transform is taken to produce an N-point vector in time-domain. From this time-domain vector we get the L consecutive (e.g., modulo N) values with highest energy. As mentioned above, the estimation provides a phase estimate up to a linear phase term (time shift) and a constant phase term. The linear phase term may be estimated based on the fact that at ideal linear phase the estimated channel impulse response should be zero for k=L . . . N. The constant phase term causes a rotation of the constellation (e.g., a QAM, BPSK, etc. . . . ), which may be corrected using a PLL as described below. Accordingly, the solution above is the estimate of $h_n$ up to a linear phase term and a constant phase term $e^{j0}$. The linear phase term may be a time delay that can be fractional, for example. An estimation of the linear phase term is described below.

The above calculation of phase applies to the general case of a complex channel (i.e., real and imaginary components). In the case of a real channel an estimated phase can be provided by exploring the fact that $\phi_0 = 0$ and $\phi_{N-n} = -\phi_n$. In this case, the channel phase can be estimated from $\psi_n$ as follows:

$$\varphi_n = \frac{N-n}{n} \sum_{i=0}^{n-1} \psi_i - \frac{n}{N} \sum_{i=n}^{N-1} \psi_i, \forall n = 0 \ldots N-1$$

Also the estimated channel impulse response in this case is written as:

$$\hat{h}_k = \frac{1}{N} \sum_{n=0}^{N-1} \sqrt{\Gamma\left(\frac{n}{N}\right)} \cos(2\pi k \Omega_n + \varphi_n)$$

The above described technique provides an estimate of the channel impulse response where the channel has no spectral zeros, one spectral zero at DC or the Nyquist Frequency, or a complex channel having one zero. Estimations for channels with additional zeros may include information about each zero over one so that discontinuities in the phase may be accounted for. In other words, the above approach may be used for channels with more than one zero if information about phase discontinuity is provided to the receiver. For instance, assuming that a channel has one spectral zero of H, $\Omega_0 = k_0/N$, of order n, then the general case may be set forth as follows:

$$H(\Omega) = (\Omega - \Omega_0)^n G(\Omega)$$

Accordingly, estimation of H is reduced to the estimation of G, and in particular, the estimation of the phase of H is reduced to the estimation of the phase of G. Accordingly, the Fourier Transform of the cumulant may be rewritten as a function of G. If C' is defined as follows, a similar expression as the Fourier Transform of the cumulant function results:

If, $\Omega_{1,2} \neq \Omega_0$ $$C'(\Omega_1, \Omega_2) = \frac{C(\Omega_1, \Omega_2)}{(\Omega_1 - \Omega_2)^n (\Omega_2, \Omega_0)^n}$$

If $(\Omega_1 = \Omega_0)$ and $(\Omega_2 \neq \Omega_0)$ $$C'(\Omega_1, \Omega_2) = \frac{\frac{\partial^n C}{\partial \Omega_1^n}(\Omega_1, \Omega_2)}{(\Omega_2, \Omega_0)^n}$$

If $(\Omega_1 = \Omega_0)$ and $(\Omega_2 = \Omega_0)$ $$C'(\Omega_1, \Omega_2) = \frac{\partial^n}{\partial \Omega_1^n} \frac{\partial^n C}{\partial \Omega_2^n}(\Omega_1, \Omega_2)$$

These derivatives may be computed numerically. Additionally, divisions by real numbers may be ignored in determining the phase response of the cumulant. Using C', a similar expression as set forth above for H is obtained, where H is replaced with G. The same estimation algorithm as described above may used to obtain the phase $\Phi_n$ of G(n/N), for example.

The channel estimation scheme presented above, provides an impulse response of length $N \geq 2L$ (because the length of $\rho$ is 2L−1), which is equal to a delayed and a scaled (with a term $e^{j0}$) version of the channel response. As the channel response has a known length L, the unknown delay (integer and fractional part) can be found by minimizing the energy of the estimated channel taps L . . . N, i.e.

$$\sum_{k=L}^{N} |\hat{h}_k|^2$$

is minimized. Therefore, different delays may be applied to the estimated channel response and pick up the delay that minimizes $$\sum_{k=L}^{N} |\hat{h}_k|^2$$

where $\hat{h}$ denotes the delayed estimated channel.

An efficient computation of the frequency domain vector $\Gamma$ and matrix C is now disclosed. In one embodiment, $C_n$ may be estimated directly without estimating $c_{n,m}$. First, a computation of $\Gamma(\Omega)$ is provided. As described below, $\Gamma(\Omega)$ may be estimated recursively, rather than first estimating $\rho_n$ and then taking the FFT. Accordingly, the estimation of $\Gamma(\Omega)$ can be computed as:

$$\Gamma^{(p)}(\Omega) = \frac{p}{p+1} \Gamma^{(p-1)}(\Omega) + \frac{1}{p+1} r_p R^{(p)}(\Omega)$$

$$R^{(p)}(\Omega) = e^{-j2\pi\Omega} R^{(p-1)}(\Omega) - r_{p-L}^* e^{-j2\pi L \Omega} + r_{p+L-1}^* e^{j2\pi(L-1)\Omega}$$

$\Gamma(\Omega)$ can be computed at the following N frequencies:

$$\Omega = \frac{0 \ldots N-1}{N}$$

The function $R^{(p)}(\Omega)$ refers to $$R^{(p)}(\Omega) = \sum_{n=-L+1}^{L-1} r_{p-n} e^{-2j\pi n \Omega}$$

Thus, $\Gamma^{(\infty)}(\Omega) = \Gamma(\Omega)$, where $\Gamma(\Omega)$ is the Fourier Transform of the autocorrelation of the received signal. The above estimation of $\Gamma(\Omega)$ may be performed iteratively, where each sample of the input signal is received and the result of $\Gamma(\Omega)$ is updated. $R^{(p-1)}(\Omega)$ may be stored in memory to update $R^{(p)}(\Omega)$. As p increases the result converges on $\Gamma(\Omega)$. Accordingly, an average is taken over many of the received symbols to produce the final result.

Next, C may be estimated. Estimation of C may be done as follows:

$$C^{(p)}(\Omega) = \frac{p}{p+1} C^{(p-1)}(\Omega) + \frac{1}{\gamma(p+1)} \left( (|r_p|^2 - \rho_0) R^{(p)}(\Omega) R^{(p)*}\left(\Omega + \frac{1}{N}\right) - 2\Gamma^{(p)}(\Omega) \Gamma^{(p)}\left(-\Omega - \frac{1}{N}\right) \right)$$

The result is $C^{(\infty)}(\Omega) = C(\Omega, -\Omega - 1/N)$ or alternatively:

$$C_n = C^{(\infty)}\left(\frac{n}{N}\right)$$

where n/N sets the value of $C_n$ at a given frequency. This allows the load of the computation of $\Gamma$ and C to be distributed over all the received symbols and discards the need for the FFT or 2D FFT operation set forth above. From the above relation, $C_n$ may be selected and the phase may be determined as set forth above.

EXAMPLE—DFE

Figure 4:
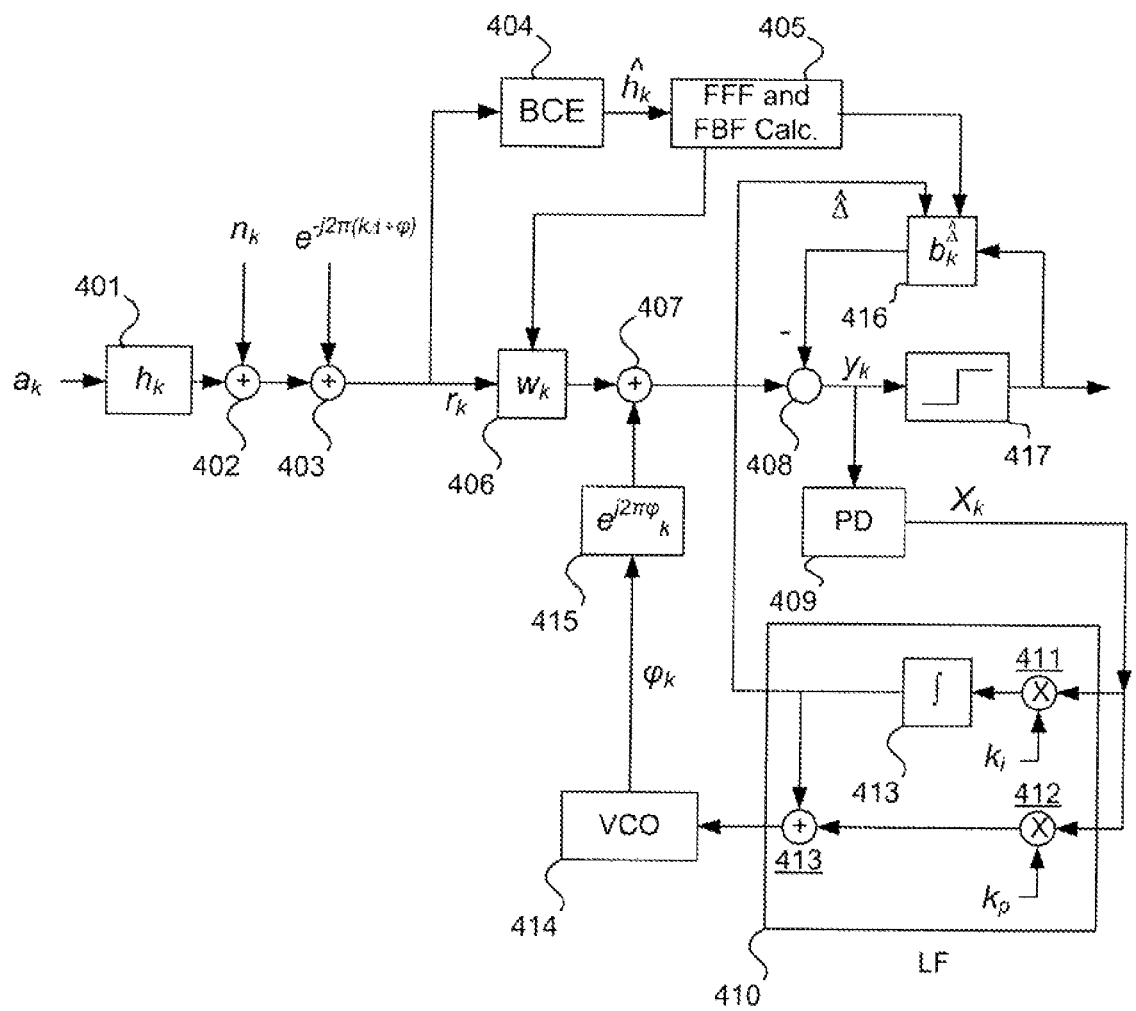
FIG. 4 illustrates decision feedback equalization ("DFE") and carrier recovery according to one example use of the present invention.

FIG. 4 illustrates decision feedback equalization ("DFE") and carrier recovery according to one example use of the present invention. The channel impulse response estimation discussed above (blind channel estimation) may be used to design a DFE-based receiver. The DFE receiver in FIG. 4 receives a transmitted signal, $a_k$, through a channel modeled by an impulse response, $h_k$, 401 and additive Gaussian white noise, $n_k$, 402. The input signal, rk, received by the receiver is coupled to the input of blind channel estimator 404. Based on the received signal, $r_k$, the blind channel estimation described above is used to generate an estimate of the impulse response. In the presence of a normalized frequency offset $\Delta$, the ideal blind channel estimation output can be shown to be as follows:

$$\hat{h}_k^\Delta = h_k e^{-j2\pi k \Delta}$$

Based on the estimated channel, we compute initial FFF $w_k$ and FBF $b_k$ (for a given SNR and total delay). In this example, the input signal is first processed using the FFF $w_k$ at 406. The output of the FFF 406 is added with an output signal from a phase locked loop ("PLL") that includes a phase detector 409, loop filter 410, voltage controlled oscillator ("VCO") 414, and phase shift block 415. The result is provided to the feedback system including the FBF 416.

If frequency offset compensation is done after the FFF as in FIG. 4, then the FBF may to account for the frequency offset. The actual FBF should be as follows:

$$b_k^\Delta = b_k e^{j2\pi k}$$

where $\hat{\Delta}$ is the estimated frequency offset. This is taken from the PLL as the average output of the loop filter integrator 413.

Carrier recovery may be performed in two steps. In the first step, the FFF and FBF may be fixed and a non-decision-directed carrier recovery is applied. In a non-decision-directed carrier recovery, a reduced-constellation phase detector (PD) is used, which employs a weighted form so that more reliable samples are emphasized. In the second step, because detection SNR is improved, we switch to decision-directed carrier recovery. In a decision-directed scheme one would detect a constellation point first, and then use that in the PD. The reduced constellation scheme consists of relaying only on the sign of $y_k$ as illustrated at 417. The output of PD 409 is given by:

$$xk = (y_k^r \cdot \text{sgn}(y_k^i) - y_k^i \cdot \text{sgn}(y_k^r))w(y_k)$$

where $y_k^r$ and $y_k^i$ denote the real and imaginary parts of $y_k$, and $w(y_k)$ is a weighting function that emphasizes larger signal values. One weighting function that may be used is as follows:

$$w(y) = |y|^2$$

In the decision-directed mode also the FFF and FBF are adapted using the LMS algorithm.

EXAMPLE—ETHERNET

Figure 5:
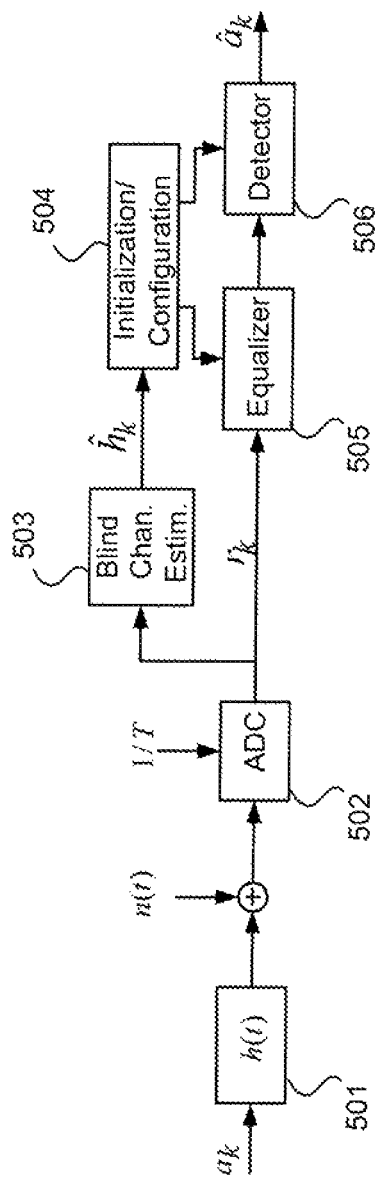
FIG. 5 illustrates another example system using another embodiment of the present invention.

FIG. 5 illustrates another example system using another embodiment of the present invention. In this example, the technique described above is used for channel estimation in an Ethernet system (e.g., a 10G-LRM system). In FIG. 5, the channel 501 is illustrated as h(t). A signal $a_k$ is transmitted through the channel 501. Noise in the channel is illustrated here by adding noise n(t). The output of the channel is coupled to the input of a sampler. The received signal may be a binary phase-shift keyed ("BPSK") signal, for example. In this example, the sampler is an analog-to-digital converter ("ADC") 502, which samples at a baud rate of 1/T. The output signal of ADC 502 is a signal $r_k$. The sampled input signal $r_k$ is coupled to blind channel estimation block 503.

Blind channel estimation block 503 may implement an algorithm that first estimates three vectors R, Γ, C of length N (e.g., N=16) and one scalar for the autocorrelation, ρ. In one example implementation, the following relation may be specified:

$$\Omega_k = -0.5 + \frac{k}{16} \quad k = 0 \ldots 15$$

If the channel length is set to L=12, which may be a worst case estimate, for example, the estimation of the vectors may be determined as follows:

1) $R^{new}(\Omega) = R^{old}(\Omega)e^{-j2\pi\Omega} - r_{p-L}e^{-j2\pi L\Omega} + r_{p+L}e^{j2\pi(L-1)\Omega}$ 2) $\Gamma^{new}(\Omega) = (1 - \mu)\Gamma^{old}(\Omega) + \mu r_p R(\Omega)$ 3) $\rho^{new} = (1 - \mu)\rho^{old} + \mu r_p \times r_p$ 4) $C^{new}(\Omega) =$ $$(1 - \mu)C^{old}(\Omega) - \mu\left((r_p^2 - \rho)R(\Omega)R*\left(\Omega + \frac{1}{N}\right) - 2\Gamma(\Omega)\Gamma\left(\Omega + \frac{1}{N}\right)\right)$$

where μ is the update constant and $r_p$ is the ADC output.

Once the iterative estimation converges, C may be used to estimate the phase response of the channel and Γ may be used to estimate the amplitude response. For instance, the channel phase response may be computed as follows:

$$\varphi k = \frac{N-k}{N}\sum_{i=0}^{k-1}\psi_i - \frac{k}{N}\sum_{i=k}^{N-1}\psi_i$$

$$k = 0 \ldots N - 1$$

where ψk denotes the phase of $C(\Omega_k)$, i.e.

$$\psi k = \frac{1}{2\pi}\arctan\left(\frac{\text{Im}(C(\Omega_k))}{\text{Re}(C(\Omega_k))}\right).$$

The estimated channel response may be computed as follows:

$$\hat{h}_n = \frac{1}{N}\sum_{k=0}^{N-1}\sqrt{\Gamma_k}\cos(2\pi(n\Omega_k + \varphi k)).$$

Referring again to FIG. 5, the estimated channel response may be output by blind channel estimator 503 and received by an initialization/configuration block 504. The initialization/configuration block may configure equalizer 505 and detector 506 to process the sampled received signal $r_k$. The output is an estimate of the transmitted signal, $\hat{a}_k$.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, information retrieval methods according to the present invention may include some or all of the innovative features described above. Based on the above disclosure and the following claims, other arrangements, embodiments, implementations and equivalents will be evident to those skilled in the art and may be employed without departing from the spirit and scope of the invention as defined by the claims.

What is claimed is:

1. A receiver comprising:
   a sampler to sample an input signal, the input signal having been received by the receiver through a communication channel;
   a channel estimation circuit to:
      receive the sampled input signal;
      estimate an amplitude response of the communication channel by autocorrelating the input signal;
      estimate a phase response of the communication channel using a fourth order cumulant of the input signal, and
      generate an estimated impulse response of the communication channel based on the estimated amplitude response and the estimated phase response; and
   a channel initialization circuit to configure the receiver based on the estimated impulse response.

2. The receiver of claim 1 wherein the phase response is iteratively estimated at a particular frequency.

3. The receiver of claim 2 wherein the phase response is estimated according to a phase equation $\psi_n = \phi_{n+1} - \phi_n$, where $\psi_n$ is a phase of the fourth order cumulant of the input signal, and $\phi_n$ and $\phi_{n+1}$ represent the phase response at different frequencies.

4. The receiver of claim 3 wherein the phase response is determined from the phase equation using least squares fit comprising a matrix inversion.

5. The receiver of claim 3 wherein the phase response is determined from the phase equation recursively.

6. The receiver of claim 1 wherein said estimating the fourth order cumulant of the input signal comprises:
- estimating the Fourier Transform of the input signal; and
- estimating the Fourier Transform of the fourth order cumulant based on the estimated Fourier Transform of the input signal.

7. The receiver of claim 6 wherein estimating the Fourier Transform of the input signal and the fourth order cumulant are performed iteratively at the sample rate of the sampler.

8. The receiver of claim 6 wherein estimating the Fourier Transform of the input signal and the fourth order cumulant are determined across a plurality of discrete time frequencies to produce an average over many received symbols.

9. The receiver of claim 1 wherein the communication channel is a digital cable.

10. The receiver of claim 1 wherein the communication channel is an Ethernet cable.

11. A method of receiving a signal across a communication channel, the method comprising:
- receiving, at a receiver, an input signal transmitted across the communication channel;
- estimating an amplitude response of the communication channel by autocorrelating the input signal;
- estimating a phase response of the communication channel using a fourth order cumulant of the input signal;
- generating an estimated impulse response of the communication channel based on the estimated amplitude response and the estimated phase response; and
- configuring the receiver based on the estimated impulse response.

12. The method of claim 11 wherein the phase response is estimated iteratively at a particular frequency.

13. The method of claim 12 wherein the phase response is estimated according to a phase equation $\psi_n = \phi_{n+1} - \phi_n$, where $\psi_n$ is a phase of the fourth order cumulant of the input signal, and $\phi_n$ and $\phi_{n+1}$ represent the phase response at different frequencies.

14. The method of claim 13 wherein the phase response is determined from the phase equation using least squares fit comprising a matrix inversion.

15. The method of claim 13 wherein the phase response is determined from the phase equation recursively.

16. The method of claim 11 wherein said estimating the fourth order cumulant of the input signal comprises:
- estimating the Fourier Transform of the input signal; and
- estimating the Fourier Transform of the fourth order cumulant based on the estimated Fourier Transform of the input signal.

17. The method of claim 16 wherein estimating the Fourier Transform of the input signal and the fourth order cumulant are performed iteratively at the sample rate.

18. The method of claim 16 wherein estimating the Fourier Transform of the input signal and the fourth order cumulant are determined across a plurality of discrete time frequencies to produce an average over many received symbols.

19. The receiver of claim 1, wherein the input signal is not a training signal.

20. The method of claim 11, wherein the input signal is not a training signal.

* * * * *